United States Patent Office 3,062,845
Patented Nov. 6, 1962

3,062,845
PROCESS FOR THE CONVERSION OF α-ACETYL STEROIDS TO β-ACETYL STEROIDS AND INTERMEDIATES THEREIN
John S. Mills, Howard J. Ringold, and Carl Djerassi, Mexico City, Mexico, assignors, by mesne assignments, to Syntex Corporation, a corporation of Panama
No Drawing. Filed June 3, 1959, Ser. No. 830,971
Claims priority, application Mexico June 6, 1958
8 Claims. (Cl. 260—397.4)

The present invention relates to a novel process for the preparation of cyclopentanophenanthrene compounds and to certain novel intermediates.

More particularly, the present invention relates to a process for the conversion of steroids having at C-17 a β-acyloxy and an α-acetyl into the corresponding compounds having a β-acetyl or pregnane side chain.

The present process is therefore a valuable one for the production, for example of progesterone or 19-nor progesterone from the corresponding 17α-ethinyl testosterone type compound or from 17α-ethinyl estradiol since novel intermediates having an iso pregnane side chain and a β-hydroxy group may be readily prepared from the corresponding compounds having a β-hydroxy or acyloxy group and an α-ethinyl group at C-17.

The novel process of the present invention is illustrated by the following equation:

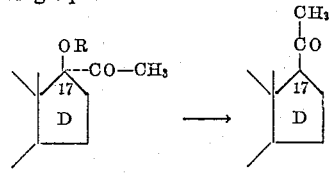

In the above equation only ring D of a steroid compound is disclosed since the reaction involves only the side chain at C-17 as indicated above. In the above equation R represents an acyl group of a hydrocarbon carboxylic acid of up to 12 carbon atoms i.e. conventional known ester groups such as the acetate, benzoate, cyclopentylpropionate etc.

The starting materials for the process are prepared by a known process from the corresponding 17β-hydroxy, 17α-ethinyl compounds involving treatment with positive halogen to form, from the 17α-ethinyl group, the 17α-dihaloacetyl group followed by dehalogenation (Fieser and Fieser, Natural Products Related to Phenanthrene, third edition, page 438). By this method there was formed certain novel intermediates of the following formulas:

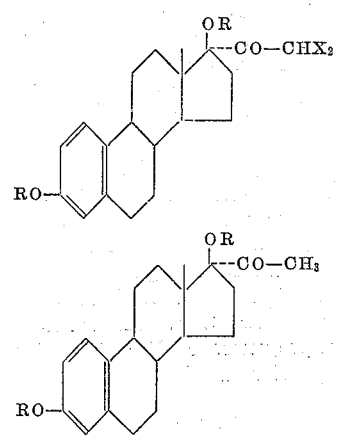

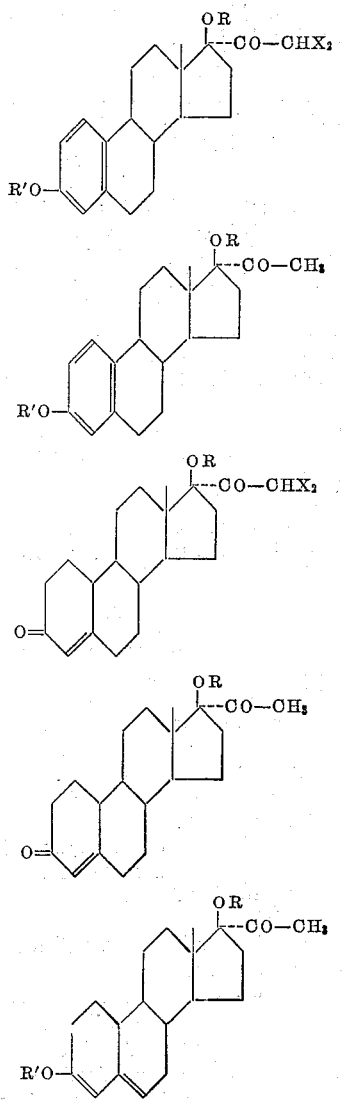

In the above formulas R represents the same group as heretofore set forth and R' represents lower alkyl such as ethyl or propyl. X represents bromine, chlorine or iodine.

In practicing the process above outlined the starting material where a keto group was involved such as a 3-keto group were converted to a 3-enol ether derivative in order to protect the 3-keto group from the action of reducing agents hereinafter described. Thus 17α-acetyl-19-nor-testosterone acetate was converted into its 3-lower alkyl enol ether derivative illustrated as one of the novel intermediates above. The starting compounds were then treated with an alkali metal or alkaline earth metal in liquid ammonia for a period of one half to two hours followed by the addition of a lower aliphatic alcohol such as methanol. Upon evaporation and purification the resultant product in the case of an alkaline earth metal was the corresponding 17β-acetyl compound. Where an alkali metal was used the 20-keto group was also reduced to a 20-hydroxy group which was easily oxidized by conventional means such as chromic acid back to the 20-keto group. Another advantage for the use of an alkali metal in ammonia occurs where the starting compound has an aromatic ring A, such as the acetate of the 3-methyl-ether of 17α-acetyl-estradiol. In this case the aromatic ring is also reduced so that upon hydrolysis of the ether group and oxidation there is prepared 19-nor-progesterone.

The following specific examples serve to illustrate but are not intended to limit the present invention.

*Example I*

A mixture of 10 g. of 17α-ethinyl-estradiol, 100 cc. of acetic anhydride and 3 g. of p-toluenesulfonic acid was allowed to react overnight at room temperature. It was then poured into water, kept standing for 1 hour and the precipitate was collected by filtration, washed with water, air dried and recrystallized from methanol. There was thus obtained 17α-ethinyl-estradiol diacetate, M.P. 138–140° C.; $[\alpha]_D \pm 0°$ (chloroform).

A mixture of 1.9 g. of the above diacetate, 100 cc. of acetic acid, 2 g. of sodium acetate and 10 cc. of water was treated with 2.1 g. (3 mols) of N-bromoacetamide, at room temperature for 2 hours. The mixture was diluted with water and the precipitate was collected, washed with water, and air dried. There was thus obtained 17α-dibromoacetyl-estradiol diacetate, with M.P. 185–190° C., which was used for the next step without further purification. The analytical sample, obtained by crystallization from chloroform-ethanol, had M.P. 196–198° C.; $[\alpha]_D -13.4°$, $\nu$ max. 1727 and 1755 cm.$^{-1}$.

A mixture of 2.7 g. of the above dibromoketone, 100 cc. of acetic acid and a solution of 2.5 g. of sodium acetate in 10 cc. of water was treated with 3.5 g. of zinc dust and stirred at the temperature of the steam bath for 15 minutes; the zinc was removed by filtration, the filtrate was diluted with water and the precipitate was collected, washed with water, dried and recrystallized from methanol-ethyl acetate, thus yielding 17α-acetyl-estradiol diacetate, M.P. 172–174° C. The analytical sample showed M.P. 178–180° C.; $[\alpha]_D +46.6°$ (chloroform); $\nu$ max. 1710, 1730 and 1760 cm.$^{-1}$.

A solution of 2 g. of the above compound in 20 cc. of anhydrous dioxane was added to a solution of 1 g. of calcium in 300 cc. of liquid ammonia and the mixture was stirred for 1 hour; there was then quickly added 5 cc. of methanol and the mixture was stirred for half an hour further and treated with 5 g. of ammonium chloride; the ammonia was allowed to evaporate, the residue was diluted with water and the solid was collected by filtration, washed with water, dried and recrystallized from ethyl acetate. There was thus obtained 17β-acetyl-1,3,5-estratrien-3-ol, M.P. 244–247° C. Several recrystallizations from the same solvent afforded material with M.P. 247–249° C.; $[\alpha]_D +164°$ (chloroform), which showed no depression in the M.P. in mixture with an authentic sample of this compound; the infrared spectra were identical.

By the following modification of the aforementioned steps there was attained a considerable increase in the yield, without the need of purifying the reaction products: 200 g. of ethinylestradiol was acetylated by reaction with 1500 cc. of acetic anhydride and 50 g. of p-toluenesulfonic acid; the crude compound was precipitated in water, dissolved in 16 lt. of acetic acid containing 280 g. of sodium acetate and 1200 cc. of water, the mixture was treated with 360 g. of N-bromoacetamide, under stirring for 3 hours and the reaction product was precipitated by the addition of water, collected and debrominated by treatment with 480 g. of zinc in a mixture of 10 lt. of acetic acid and 300 g. of sodium acetate; recrystallization of the product from ethanol afforded 17α-acetyl-estradiol with M.P. 171–175° C.; the latter was reduced by reaction with 100 g. of calcium in 15 lt. of ammonia; after 1 hour there was added 1.25 lt. of methanol and after a further half hour 500 g. of ammonium chloride was added; the compound thus obtained was crystallized from ethyl acetate, to yield 17β-acetyl-1,3,5-estratrien-3-ol with M.P. 245–248° C.

*Example II*

A mixture of 20 g. of the 3-methyl-ether of 17α-ethinyl-estradiol, 6 g. of p-toluenesulfonic acid and 200 cc. of acetic anhydride was allowed to react overnight at room temperature. Most of the reaction product, namely the acetate of the 3-methyl-ether of ethinyl-estradiol, separated from the mixture under the form of a crystalline precipitate which was collected, washed with water and dried; M.P. 160–163° C. The mother liquor was diluted with water and the precipitate was collected, washed with water and redissolved in benzene-hexane; the solution was filtered through a short column of neutral alumina, the filtrate was evaporated to dryness and the residue crystallized from methanol-ethyl acetate, thus giving an additional crop of the acetate of 17α-ethinyl-estradiol 3-methyl-ether having identical properties to those of the compound obtained previously. The analytical sample showed M.P. 162–164° C.; $[\alpha]_D \pm 0°$ (chloroform); $\nu$ max. 3280 and 1740 cm.$^{-1}$.

A solution of 1.75 g. of the above compound in 75 cc. of t-butanol containing 1 cc. of water was treated under stirring with 1.6 g. of N-bromoacetamide (2.4 mols). After a few minutes there separated in crystalline form the acetate of 17α-dibromoacetyl-estradiol 3-methyl-ether; after stirring for a total of 1 hour there was added 25 cc. of water and the mixture was cooled in an ice bath; the precipitate was collected, washed with a little cold methanol and dried. There was thus obtained the acetate of 17α-dibromoacetyl-estradiol 3-methyl-ether with M.P. 204–208° C. The analytical sample was obtained by recrystallization from methylene chloride-methanol and showed M.P. 212–214° C., $[\alpha]_D -16°$ (chloroform), $\nu$ max. 1740 cm.$^{-1}$.

8.67 g. of the above compound was treated with a mixture of 300 cc. of acetic acid, 8 g. of sodium acetate, 30 cc. of water and 11 g. of zinc dust, and the product was worked up by following the procedure described in Example I. There was thus obtained the acetate of 17α-acetyl-estradiol 3-methyl-ether with M.P. 156–160° C.; the analytical sample showed M.P. 159–161° C., $[\alpha]_D +52.5°$ (chloroform); $\nu$ max. 1715 and 1760 cm.$^{-1}$.

A solution of 2 g. of the above ketone in 20 cc. of anhydrous dioxane was added to a solution of 1 g. of lithium in 500 cc. of liquid ammonia and the mixture was stirred for 1 hour; there was then added 50 cc. of methanol and after 15 minutes further another 4 g. of lithium, under continuous stirring. The ammonia was allowed to evaporate and after the addition of water the product was collected. Without further purification, the product was refluxed for 1 hour with 30 cc. of 4 N aqueous hydrochloric acid and 50 cc. of methanol, cooled and extracted with ethyl acetate; the extract was washed with water, dried over anhydrous sodium sulfate and the ethyl acetate was evaporated. The oily residue was dissolved in 50 cc. of acetone and treated at room temperature for 1 hour with an excess of 8 N chromic acid prepared by the conventional method dissolving chromium trioxide in a mixture of concentrated sulfuric acid and water. After diluting with water the crystalline precipitate was collected, washed with water, dried and dissolved in benzene. The solution was filtered through a short column of neutral alumina, the filtrate was evaporated to dryness and the residue crystallized from acetone-hexane, thus furnishing 19-nor-progesterone, M.P. 141–144° C., which showed no depression in mixture with an authentic sample of 19-nor-progesterone; $[\alpha]_D +154.5°$ (chloroform); $\lambda$ max. 240 m$\mu$, log E 4.25; the infrared spectrum was identical to that of an authentic sample of 19-nor-progesterone.

*Example III*

A solution of 10 g. of 17α-ethinyl-19-nor-testosterone 17-acetate in a mixture of 250 cc. of t-butanol and 10 cc. of water was treated with stirring with 8.8 g. of N-bromoacetamide, at room temperature; after 2 hours water was added and the precipitate formed was collected by filtration, washed with water and dried under vacuum. There was thus obtained 17α-dibromoacetyl-19-nor-testosterone 17-acetate, which was used for the next step without further purification; ν max. 1620, 1670 and 1750 (weak) cm.$^{-1}$.

The above dibromo compound was mixed with 570 cc. of acetic acid, 14 g. of sodium acetate, 30 cc. of water, and 17 g. of zinc dust and the mixture was heated on the steam bath under stirring for 15 minutes. The zinc was removed by filtration and the product was precipitated from the filtrate by the addition of saturated sodium chloride solution; the precipitate was collected, washed with a little cold water, dried and recrystallized from aqueous methanol. There was thus obtained 17β-acetoxy-19-nor-isoprogesterone with M.P. 162–165° C. Upon evaporation of the mother liquors and chromatography of the residue there was obtained an additional fraction of the compound having identical properties. The analytical sample showed M.P. 173–174° C.; [α]$_D$ +30.3° (chloroform); λ max. 240 mμ, log E 4.23; ν max. 1615, 1660, 1720 and 1740 cm.$^{-1}$.

A solution of 5.5 g. of the above compound in 95 cc. of dioxane was treated with 12.6 cc. of ethyl orthoformate and 190 mg. of p-toluenesulfonic acid and the mixture was stirred at room temperature for 40 minutes. There was added 6.5 cc. of pyridine and then water and the product was extracted with ethyl acetate. The extract was washed with water, dried over anhydrous sodium sulfate, the ethyl acetate was evaporated and the residue crystallized from aqueous methanol containing one drop of pyridine, thus yielding 3-ethoxy-17β-acetoxy-19-nor-Δ$^{3,5}$-pregnadien-20-one with M.P. 132–133° C. The analytical sample showed M.P. 132–135° C., λ max. 242 mμ, log E 4.16, ν max. 1625, 1650, 1710 and 1740 cm.$^{-1}$.

A solution of 1 g. of the above enol-ether in 25 cc. of anhydrous dioxane was added to a solution of 0.5 g. of calcium in 250 cc. of liquid ammonia and the mixture was stirred for 30 minutes; there was then added 4 g. of ammonium chloride, the ammonia was evaporated, the residue was treated with water and the solid was filtered. The latter was refluxed in a mixture of 5 cc. of concentrated hydrochloric acid and 25 cc. of water, cooled, diluted with water and the product was extracted with ethyl acetate. The extract was washed with water, dried over anhydrous sodium sulfate and evaporated to dryness. The oily residue was purified by filtration through a short column of neutral alumina followed by evaporation of the solvent and crystallization of the residue from acetone-hexane. There was thus obtained 19-nor-progesterone with M.P. 140–142° C., which suffered no depression in mixture with an authentic sample of the compound.

*Example IV*

2 g. of 3,17-diacetate of isoallopregnan-3β,17β-diol-20-one in 20 cc. of anhydrous tetrahydrofurane was added to a solution of 1 g. of lithium in 500 cc. of liquid ammonia and the mixture was stirred for 1 hour; there was then added 4 g. of ammonium chloride, the ammonia was evaporated, the residue was treated cautiously with water and the solid was filtered. Purification of the residue by crystallization from acetone-hexane gave allopregnan-3β-ol-20-one.

*Example V*

By the same method as described in Example IV, but substituting diethylether for tetrahydrofurane and sodium for lithium there was obtained the same allopregnan-3β-ol-20-one.

*Example VI*

By the same method as described in Example IV, but substituting potassium for lithium there was obtained the same allopregnan-3β-ol-20-one in essentially the same yields.

*Example VII*

By the same method as described in Example III, but using 17α-ethinyl testosterone instead of 17α-ethinyl-19-nor-testosterone there was obtained progesterone; as intermediate compounds, there was obtained the 17-acetate of 17α-dibromo acetyl testosterone, 17β-acetoxy isoprogesterone and the ethyl enol ether of 17β-acetoxy isoprogesterone.

We claim:
1. A process for the production of a steroid having a 17β-acetyl group comprising reacting a corresponding steroid having at C–17, a 17α-acetyl group and a 17β-acyloxy group with a metal selected from the group consisting of an alkali metal and an alkaline earth metal in liquid ammonia followed by reaction with a lower aliphatic alcohol.
2. The process of claim 1 wherein the metal is an alkali earth metal.
3. The process of claim 1 wherein the metal is calcium.
4. The process of claim 1 wherein the metal is an alkali metal, the steroid has an aromatic ring A and the product is a 19-nor steroid.
5. A compound of the following formula:

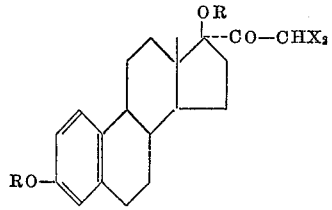

wherein R represents a hydrocarbon carboxylic acyl group of up to 12 carbon atoms and X is selected from the group consisting of bromine, chlorine and iodine.

6. A compound of the following formula:

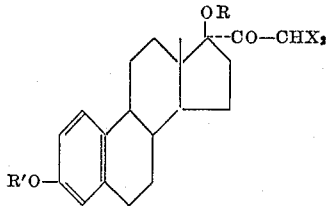

wherein R′ represents a lower alkyl group, R represents a hydrocarbon carboxylic acyl group of up to 12 carbon atoms and X is selected from the group consisting of bromine, chlorine and iosine.

7. A compound of the following formula:

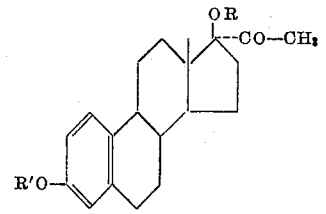

wherein R′ represents lower alkyl and R represents a hydrocarbon carboxylic acyl group of up to 12 carbon atoms.

8. A compound of the following formula:
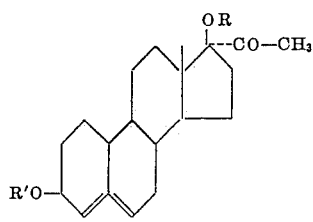
wherein R′ represents lower alkyl and R represents a hydrocarbon carboxylic acyl group of up to 12 carbon atoms.
References Cited in the file of this patent
UNITED STATES PATENTS
2,598,652 Velluz et al. _____ May 27, 1952
2,872,462 Loechel _____ Feb. 3, 1959
OTHER REFERENCES
Fieser et al.: Natural Products Related to Phenanthrene, 3rd edition, pages 328, 437 and 438 (1949).

UNITED STATES PATENT OFFICE
CERTIFICATE OF CORRECTION

Patent No. 3,062,845                               November 6, 1962

John S. Mills et al.

It is hereby certified that error appears in the above numbered patent requiring correction and that the said Letters Patent should read as corrected below.

Column 7, lines 2 to 10, the formula should appear as shown below instead of as in the patent:

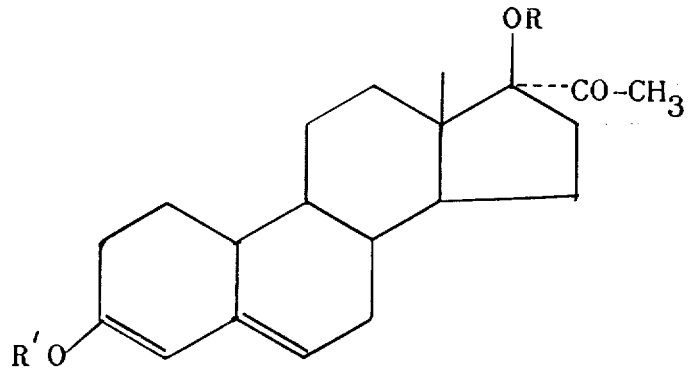

Signed and sealed this 2nd day of April 1963.

(SEAL)
Attest:

ESTON G. JOHNSON                                  DAVID L. LADD

Attesting Officer                              Commissioner of Patents